Patented Nov. 10, 1925.

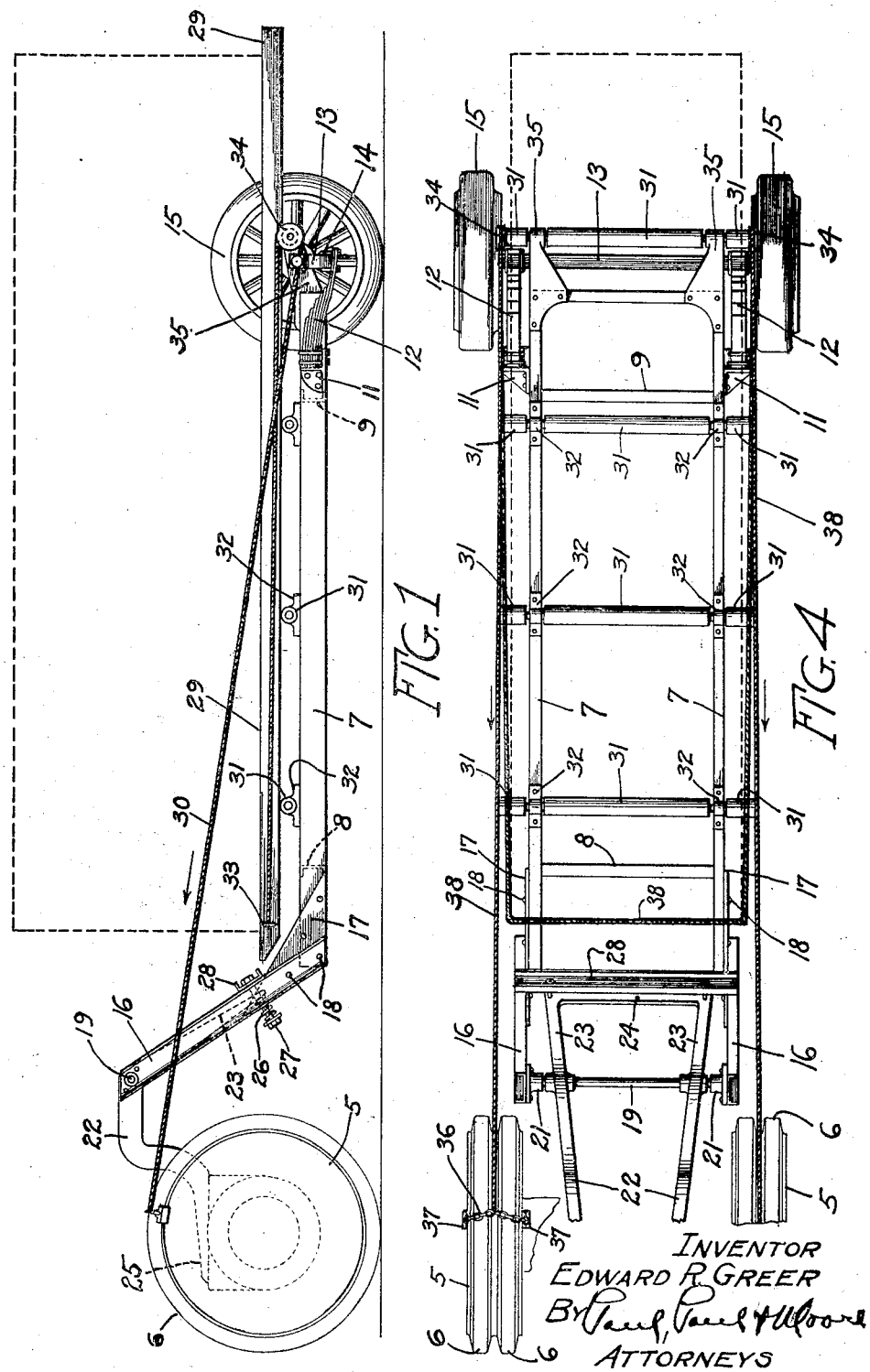

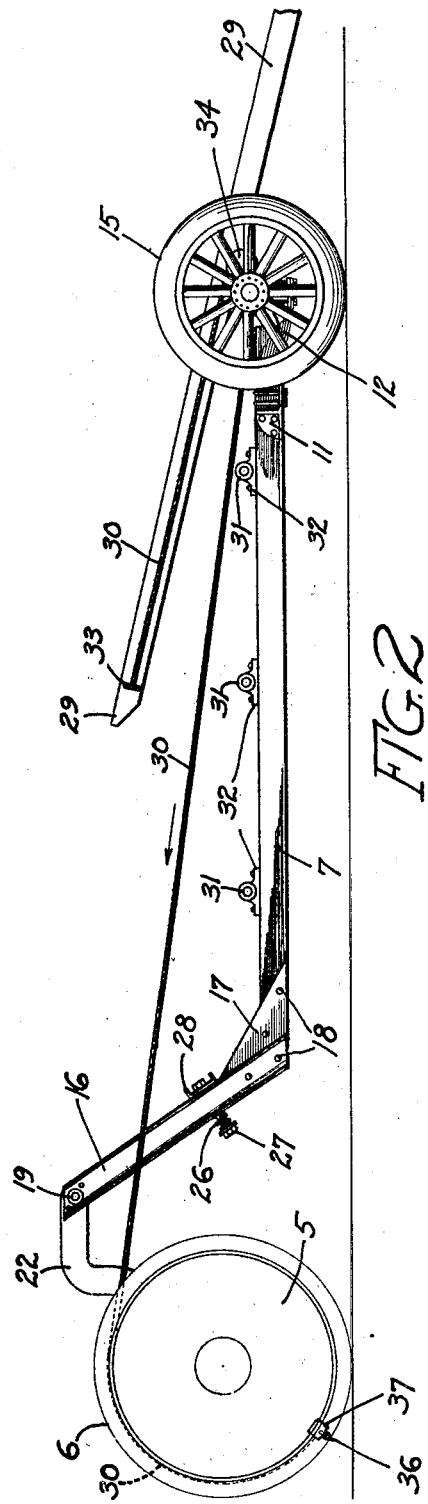

1,561,157

UNITED STATES PATENT OFFICE.

EDWARD R. GREER, OF MINNEAPOLIS, MINNESOTA, ASSIGNOR TO W. O. WINSTON, JR., OF MINNEAPOLIS, MINNESOTA.

TRAILER UNLOADING MECHANISM.

Application filed January 10, 1925. Serial No. 1,653.

*To all whom it may concern:*

Be it known that I, EDWARD R. GREER, a citizen of the United States, resident of Minneapolis, in the county of Hennepin and State of Minnesota, have invented certain new and useful Improvements in Trailer Unloading Mechanisms, of which the following is a specification.

This invention relates to new and useful improvements in trailer unloading mechanisms adapted for use to unload or discharge a load from a trailer, and more particularly relates to such a device which is actuated by the forward movement of the tractor or other propelling means.

The primary object of this invention is to provide a simple and inexpensive mechanism which, when used in conjunction with a trailer and tractor, of ordinary construction, and when in operative position, will cause the load on the trailer to be unloaded when the tractor and trailer are forwardly moved by the motive power of the tractor. When unloading the trailer with this simple device, the load will remain in substantially fixed relation to the surface of the ground, while the trailer is, in effect, being outwardly drawn from beneath the load, thereby making it possible to discharge the load upon a definite location on the ground.

A further and more specific object of the invention is to provide an unloading mechanism preferably comprising one or more cables which are adapted to be secured to the forward end of the load and backwardly pass therefrom over a pair of sheaves mounted adjacent the rear end of the trailer. From these sheaves the cables are returned to the forward end of the trailer and have their ends demountably secured to the periphery of the tractor wheels so that when the tractor is forwardly moved by its own power, the ends of the cables will be wound upon the periphery of the drive wheels, thereby causing the load to remain in substantially a fixed relation to the ground while the trailer is being withdrawn from therebeneath.

The object of the invention, therefore, is to provide an improved trailer unloading mechanism.

Other objects of the invention will appear from the following description and the accompanying drawings and will be pointed out in the annexed claims.

In the drawings there has been disclosed a structure designed to carry out the various objects of the invention but it is to be understood that the invention is not confined to the exact features shown, as various changes may be made within the scope of the claims which follow.

In the drawings:

Figure 1 is a view in side elevation of the rear end portion of a tractor, showing a trailer, embodying the invention, connected thereto, one wheel of the trailer being removed to more plainly show how the cable is mounted on the rear end of the trailer;

Figure 2 is a similar view showing the mechanism in unloading position;

Figure 3 is a view showing a slightly modified construction wherein a single cable is used for unloading;

Figure 4 is a plan view of Figure 3 with the load removed.

In the selected embodiment of the invention here shown, there is illustrated the rear end portion of a tractor, of ordinary construction, comprising the usual drive wheels 5, which, on small tractors, are usually provided with dual rubber tires 6, as shown in Figure 4.

The form of trailer here shown preferably comprises the opposed side beams 7 which are suitably secured together by means of cross bars 8 and 9, as shown by the dotted lines in Figure 1 and full lines, Figure 4, thereby providing a rectangular frame of rigid construction. Brackets 11 are secured to the rear ends of the opposed side beams 7, and to these brackets a pair of cantilever springs 12 are secured, the flexible ends of the springs being secured to the rear axles 13 by such means as the U-bolts 14. The usual carrier wheels 15 are mounted on the axle 13 to support the rear end of the trailer frame.

A pair of inclined supporting members 16 are secured to the forward ends of the opposed beams 7 of the trailer frame, by such means as the gusset plates 17 and rivets 18. A shaft or rod 19 has its ends secured to the supporting members 16 by means of brackets 21 as particularly shown in Figure 4, and upon this shaft the usual diverging coupling beams 22 are mounted, as shown. The depending end portions 23 of the beams 22 are preferably connected together by means of a cross-member 24 while the forward ends 25 of the diverging beams are provided with the usual coupling mechanism for demountably connecting the trailer to the tractor. The coupling mechanism forms no part of the present invention, and therefore is indicated by dotted lines only.

Referring to Figure 1, it will be seen that the depending end portions 23 of the beams 22 are yieldably connected to the trailer frame by means of compression springs 26 and a pair of bolts 27, which have their upper ends secured to a cross member 28 secured to the inclined supporting member 16 of the trailer frame. By thus yieldably connecting the depending end portions 23 of the diverging coupling beams 22 to the forward end of the trailer frame the latter will be cushioned as the compression springs 26 will absorb all shocks or jolts imparted thereto.

One of the important features of this invention resides in the novel means provided for unloading or discharging the load from the trailer. As shown in Figures 1 and 2 a movable load-carrying platform 29 is preferably mounted upon transverse rollers 31 mounted in brackets 32 secured to the side beams of the trailer frame. Upon this platform the load is placed as indicated by the dotted lines in Figure 1. The unloading of the trailer is effected by backwardly moving the platform 29 upon the trailer frame until is assumes the position shown in Figure 2. The means provided for thus backwardly moving the platform 29 and, therefore, the load upon the trailer frame, preferably consists of a pair of cables 30, each having one end secured to the forward end of the platform 29, by means of eye-bolts 33 or other suitable means. From the eye-bolts 33, the cables extend backwardly and around a pair of sheaves 34 mounted upon brackets 35 secured to the rear end of the trailer frame, as shown in Figure 1. From the sheaves 34, the free end of each cable is returned to the forward end of the trailer and is demountably secured to the periphery of the tractor wheels, preferably by such means as the chains 36 and hooks 37, which hooks grip the inner surface of the rims of the wheels.

When the two cables have thus been demountably secured to the tractor wheels 5, the tractor will be forwardly started which will cause the cables to be substantially wound around the periphery of the wheels or between the double tires 6 as shown in Figure 4. Such winding of the cables around the tractor wheels will cause the load-carrying platform 29 to be held substantially stationary with relation to the ground surface while the trailer is being outwardly drawn from therebeneath as shown in Figure 2. When the platform 29 reaches the position shown in Figure 2, the rear end thereof will contact with the ground while the trailer is being outwardly drawn from beneath the platform. Continued forward movement of the trailer and tractor will cause the platform to become disengaged from the rear end of the trailer frame, after which it will drop to the ground surface. The load will then be supported upon the platform upon the ground, and may readily and conveniently be removed therefrom whenever desired. When the load has been removed from the platform, the latter may readily be replaced upon the trailer frame to receive another load.

In Figures 3 and 4, there is shown a slightly modified construction wherein the use of the platform 29 has been dispensed with. The structure here shown is particularly useful in hauling lumber or a similar material which may be carried directly upon the transverse rolls 31 of the trailer frame. When unloading a load of lumber as shown in Figure 3, a single cable 38 may be employed in which case each end of the cable is secured to a tractor wheel, while the central portion of the cable passes around the forward end of the lumber as shown. The operation of unloading the lumber from the trailer will be similar to that shown and described with reference to the previous figures. After the central portion of the cable has been looped around the forward end of the load of lumber, each end of the cable will be passed around the sheaves 34, after which they will be forwardly extended and demountably secured to the tractor wheels, as hereinbefore described. Forward movement of the tractor and trailer will thereby cause the load to be unloaded from the trailer frame, it being understood that the load will remain in a substantially fixed relation to the ground. This is of particular advantage when it is desired to discharge the load upon a given location on the ground.

By the employment of this simple device, the driver when about to unload, will place the trailer, carrying the load substantially upon the particular location upon which the load is to be discharged by either forward or reverse movement of the tractor and trailer. When thus positioned, the unloading cables will be connected to the tractor wheels after which the tractor and trailer may be forwardly moved with the result that the load will be discharged upon the exact location upon which the trailer was stationed before the unloading operation was commenced.

The unloading mechanism, as shown in Figures 1 and 2, employs two unloading cables, one being secured to each side of the load-carrying platform 29. It is to be understood however, that if desired, a single cable may be employed to unload from the trailer, the platform 29, and therefore the load. When a single cable is used, as shown in Figures 3 and 4, it is only necessary to provide means such as a pair of sheaves, on the forward corners of the platform to receive the central portion of the cable when positioned as shown in Figure 4. When thus using a single cable to remove the platform and load from the trailer, the cable will automatically adjust itself to any variation in the speed of the two tractor wheels, which would occur should the tractor be turned while unloading the trailer. Thus, it will be seen that by the use of a single cable as above described, and as shown in Figures 3 and 4, the full length of the cable will be, substantially equally taut regardless of whether the tractor is turning or not while unloading. When using two cables, one cable may be subjected to a relatively greater strain than the other should the tractor be turned while unloading.

Having thus described my invention what I claim as new and desire to secure by Letters-Patent, is:

1. The combination with forward draft wheels, of a trailer having a draft connection therewith, and means having peripheral connections with said wheels and adapted to apply a backward movement to the load to discharge it from the trailer upon the forward movement of said wheels.

2. The combination with a tractor and a trailer having a draft connection therewith, of flexible means having a peripheral connection with the tractor drive wheels, and adapted to impart a backward discharging movement to the load on said trailer when said tractor is moved forwardly.

3. The combination with a tractor and a trailer having a draft connection therewith, of flexible means having a draft connection with the tractor drive wheels and adapted to impart a backward movement to the load on said trailer upon forward movement of said wheels.

4. The combination with a tractor and a trailer having a draft connection therewith and adapted to support a load for rearward discharge, of means having a peripheral draft connection with the drive wheels of the tractor and a running connection with said trailer and adapted to impart a backward movement to the load on said trailer upon forward movement of said drive wheels.

5. The combination with a tractor and a trailer connected therewith and adapted to support a load for rearward discharge thereof, of means connected with said tractor and adapted to impart a backward discharging movement to the load on said trailer commensurate with the forward movement of said tractor.

6. The combination with a tractor and a trailer having draft connection therewith and provided with a rearwardly moving load-supporting platform, of means connected with said tractor and adapted to impart a backward movement to said platform upon forward movement of the tractor, such backward movement being commensurate with the forward travel of the tractor.

7. In combination with a tractor having driving wheels and a trailer having a draft connection with said tractor, sheaves on said trailer and cables having means at one end for peripheral connection with said tractor drive wheels, and passing around said sheaves and having means for applying the forward pull of said tractor to the load on said trailer to discharge it rearwardly therefrom.

8. The combination with a wheeled vehicle having means for supporting the load thereon, of flexible means having connection at one end with one of said wheels, and at the other end with the load and adapted upon movement of said wheel to discharge the load from the vehicle.

9. The combination with a wheeled vehicle adapted to receive and support a load, of means having connection at one end with one of the wheels and at the other end with the vehicle load, and adapted upon movement of said connected wheel to move the load and discharge it from the vehicle.

10. The combination with a wheeled vehicle adapted to receive and support a load, of a cable having a running connection with the vehicle, and means at one end for connection with one of the wheels and at the other end with a vehicle load, and adapted upon movement of said connected wheel to move the load and discharge it from the vehicle.

In witness whereof, I have hereunto set my hand this 26th day of December 1924.

EDWARD R. GREER.